Nov. 9, 1948.　　　F. H. MORGAN　　　2,453,334
MEAT TENDERIZER
Filed June 14, 1946　　　　　　　　　　2 Sheets-Sheet 1
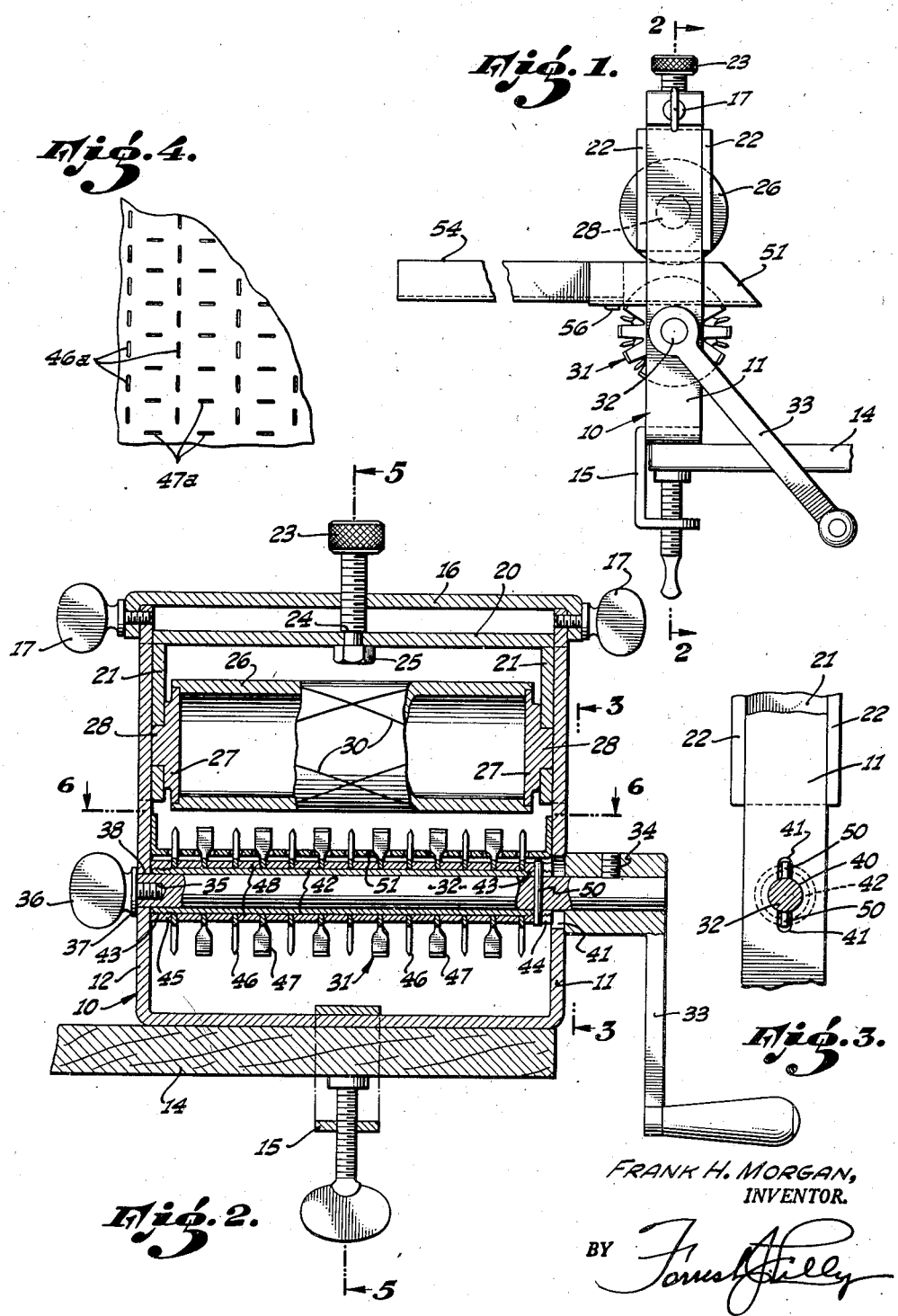
Frank H. Morgan,
INVENTOR.
BY
ATTORNEY.

Nov. 9, 1948.  F. H. MORGAN  2,453,334
MEAT TENDERIZER
Filed June 14, 1946  2 Sheets-Sheet 2
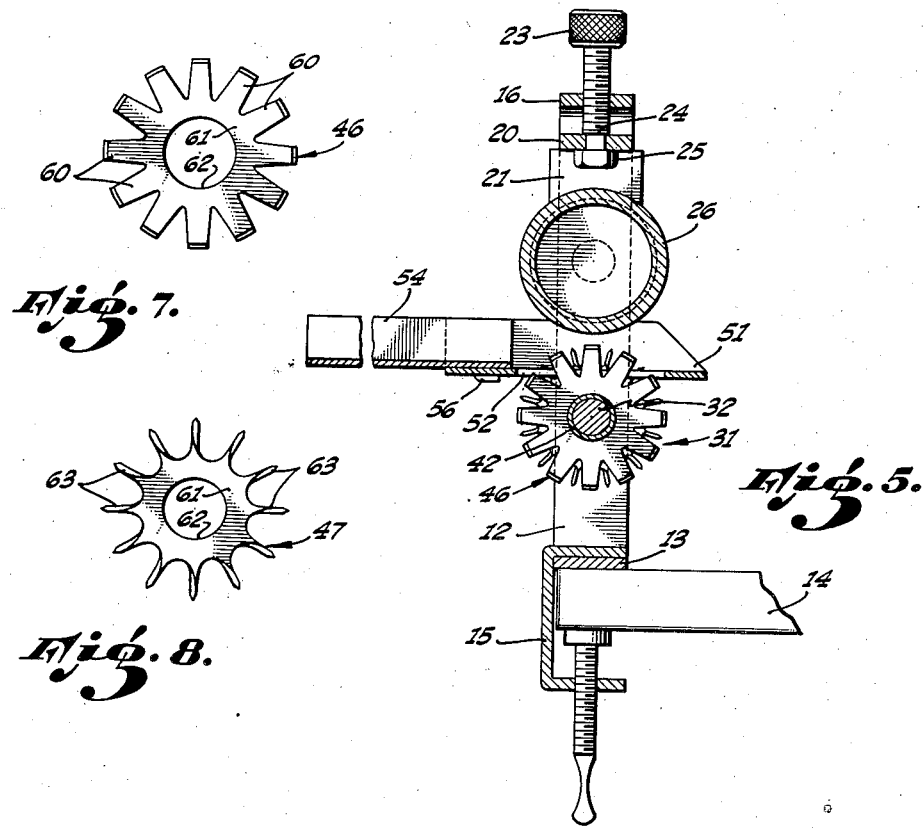
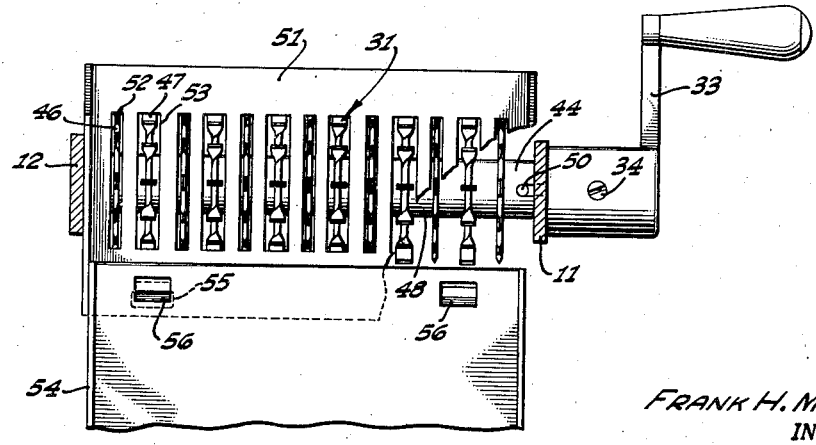
FRANK H. MORGAN,
INVENTOR.
BY
ATTORNEY.

Patented Nov. 9, 1948

2,453,334

UNITED STATES PATENT OFFICE 2,453,334

MEAT TENDERIZER

Frank H. Morgan, Glendale, Calif.

Application June 14, 1946, Serial No. 676,661

2 Claims. (Cl. 17—26)

This invention relates generally to devices for tenderizing meat, and more particularly to simple hand-operated devices of this type which are adapted for use by small restaurants, homes, and small markets for whom larger power-driven units are not practical.

It has long been recognized that it is desirable to break and cut up the fibers of meat to render the latter more palatable and tender. Heretofore, this has generally been accomplished by pounding the meat with a relatively blunt instrument, or by passing it through a motor-driven device having a series of rotating knives which are forced into the meat to cut the fibers. In general, the motor-driven devices have been relatively complicated and expensive, and suitable for use only by the larger restaurants and markets where the quantity of meat so tenderized has been sufficient to justify the large investment required. For small markets, all that has been available have been weighted devices similar to a hammer or club, with a series of projections or knives thereon which are forced into the meat to break up the fibers.

Such hand-operated devices have been relatively slow and have required a considerable amount of work to use them properly. In addition, such devices have been difficult to clean and have consequently been allowed to remain dirty for a considerable period of time, thereby presenting a definite sanitary hazard.

It is therefore a major object of this invention to provide a meat tenderizer of simple and sturdy construction which cuts and breaks the fibers of the meat so that the latter is rendered more tender.

A further object of the invention is to provide a tenderizer which cuts and breaks the fibers with a minimum of loss of the natural juices of the meat.

It is another object of the invention to provide such a device which may be easily and quickly cleaned so that the device may be kept in a sanitary condition at all times.

A further object of the invention is to provide such a meat tenderizer which may be so simply and inexpensively made that it will be suitable for use by homes and small commercial establishments.

It is still another object of this invention to provide such a tenderizer which may be operated with safety by one having no particular skill or aptitude and with perfect safety to the operator.

These and other objects and advantages of the invention will become apparent from the following description of a preferred form thereof, and from the drawings illustrating that form in which:

Figure 1 is a side-elevational view of the improved meat tenderizer;

Figure 2 is a vertical cross-sectional view taken at 2—2 in Figure 1;

Figure 3 is a partial side-elevational view of one of the uprights taken at 3—3 in Figure 2;

Figure 4 is a fragmentary view of a portion of meat which has been passed through the tenderizer, showing the pattern of the cuts formed thereby;

Figure 5 is a transverse vertical cross-sectional view taken at 5—5 in Figure 2;

Figure 6 is a horizontal cross-sectional view taken at 6—6 in Figure 2 showing the meat receiving tray;

Figure 7 is a side-elevational view of one of the two types of knives used in the device; and Figure 8 is a side-elevational view of the other type of knife.

Referring to the drawings and particularly to Figure 1, the numeral 10 indicates a U-shaped frame having a pair of vertical arms 11 and 12 joined at their lower ends by a horizontal section 13 which is adapted to be held to a board 14 or similar supporting member by a permanently attached screw clamp 15 of the usual type. At their upper ends, the arms 11 and 12 are connected together by a horizontal yoke 16 which fits over the ends of the arms and is held thereto by releasable means such as thumb screws 17. To provide the desired mechanical strength, and also for ease in cleaning, the frame 10 is preferably made of metal and the upper ends of the arms 11 and 12 are machined or otherwise formed to act as guide members.

Immediately below the yoke 16 is a crosshead 20 having arms 21 extending downwardly from its ends, these arms bearing against the inner surfaces of the uprights 11 and 12, and having flanges 22 formed along their vertical edges to engage the sides of the uprights, as shown in Figure 3. The crosshead 20 is thus vertically slidable in the frame 10, and its position in the latter is adjustable by a thumb screw 23 which is screw-threadedly mounted in yoke 16, and whose lower end is rotatably connected to the crosshead 20. The connection of the lower end of the thumb screw 23 to the crosshead 20 may conveniently be accomplished by reducing the diameter of the shank of the screw to form a shoulder 24 which bears against the upper surface of the crosshead, extending the reduced portion of the screw through the crosshead, and threading the lower portion of the reduced section to receive a nut 25 which may be tightened on the shank of the screw so as to rotate with it without touching the crosshead, permitting a sufficient looseness to be maintained between the screw and the crosshead so that the screw may rotate with respect thereto. By rotating the screw 23, it will be moved vertically with respect to the yoke 16 and will carry the crosshead 20 with it, thereby varying the vertical position of the crosshead.

A pressure roller 26 is journalled into the lower ends of the arms 21 of the crosshead 20; and to reduce the weight of the completed device, it is preferable to form the roller of tubing rather than of solid material. The roller 26 is held by plates 27 which are tightly fitted into the ends of the tubing so as to be rigidly held thereto, and the plates are formed with stub shafts 28 which are journalled into the crosshead 20. The roller 26 is lightly knurled or marked with shallow spiral grooves 30, and these insure, as hereinafter explained, the rotation of the roller whenever the device is used.

Mounted just below the vertically movable roller 26 and cooperating with the latter is a rotary knife assembly 31 carried on a horizontal shaft 32 which is journalled into the uprights 11 and 12. The shaft 32 extends completely through the uprights 11 and 12, and the end passing through upright 11 projects beyond the latter to receive a handle 33 which is held in place by a set screw 34. The other end of the shaft 34 is provided with an axially located screw-threaded hole 35 which is adapted to receive a thumb screw 36 fitting into the hole and having a shoulder 37 adapted to bear against the vertical member 12 to hold the shaft 32, in cooperation with the handle 34, against axial movement. To receive the shaft 32, a circular hole 38 is formed in the upright 12; a generally circular hole 40, having a pair of radially extending slots 41, is formed in upright 11 to receive the shaft, as shown in Fig. 3. The purpose of the slots 41 will be hereinafter described.

Slidably mounted on shaft 32 is a tubular member 42 which extends between the inner faces of the uprights 11 and 12, and which is provided with screw-threaded portions 43 at each end. A cap member 44 is screw-threadedly attached to one end of tube 42, and a similar cap 45 is screw-threadedly attached to the other end thereof.

Mounted on the tube 42 between the caps 44 and 45 are two types of rotary knives 46 and 47, shown in Figures 7 and 8 respectively. The blades of the knives 47 provide a series of cuts which are parallel to the axis of the shaft 32, while the blades of the knives 46 provide a series of cuts which are perpendicular to the cuts of blades 47. The knives 46 and 47 are mounted on tube 42 with spacers 48 between adjacent knives, the parts being arranged to provide, in order, a blade 46, a spacer 48, a blade 47, a spacer 48, a blade 46, and so on until the entire length of the tube between caps 44 and 45 is filled. The knives are thus alternated, and the cuts made thereby will be as shown in Figure 4, where cuts 46a are made by knives 46 while cuts 47a are made by knives 47. Since the knives 46 and 47 must be very firmly held to the tube 42, a convenient method of doing this is to mount cap 44 on tube 42, the tube and cap being at room temperature, and then place the knives 46 and 47 and spacers 48 on the tube. If the knives and spacers have been stored in a cold chamber which maintains a temperature considerably below zero, the physical dimensions of these parts will be smaller than normal, and their thickness will be correspondingly decreased. By then placing the cap 45 on the tube 42 and tightening the caps 44 and 45 so that considerable compressive force is exerted thereby on the knives while they are chilled, an even greater force will be exerted when the knives have been warmed to room temperature and have expanded proportionately. When this expansion has been completed, the knives 46 and 47, the spacers 48, and caps 44 and 45 are held to each other and to the tube 42 so that the entire assembly may thereafter be considered a single unit.

To impart the rotation of shaft 32 to the knife assembly 31, the cap 44 and the tube 42 are slotted across their outer ends to receive a pin 50 which is passed through the shaft 32. The pin 50 may be driven into shaft 32, or may be held therein by any suitable means so that it is not removable in the normal course of operation of the device. The radial slots 41 in the upright 11 are of sufficient size to permit pin 50 to pass therethrough but are not sufficiently large to reduce the support afforded the shaft 32 by the hole 40.

If it is assumed that the parts are in the position shown in Figure 2, the knife assembly 31 may be removed for cleaning by loosening thumb screw 36 and removing shaft 32 from the frame 10 by grasping handle 33, alining pin 50 with the slots 41, and pulling the shaft out through the hole 40. When the shaft 32 is removed, the knife assembly 31 is no longer supported in the frame 10 and may easily be removed for cleaning.

In the operation of this meat tenderizer, the meat to be treated is passed between the roller 26 and the knife assembly 31; and to support the meat at this point, a pan 51 is mounted on the frame 10 so that its lower surface is just above the spacers 48, while knives 46 and 47 extend through slots 52 and 53 respectively in the pan. The pan 51 extends from upright 11 to upright 12, as shown in Figures 3 and 6; and shown in the latter figure and in Figure 1, the pan is relatively short, and extends only a small distance in front of and behind the knife assembly 31. To support a larger piece of meat in its passage through the tenderizer, a tray 54 is removably attached to the pan 51 by means of slots 55 formed in the pan into which cooperating ears 56 in the tray may be slipped. The pan 51 and tray 54 in their assembled position are shown in Figure 5.

It has been found that the shape of the rotary knives 46 and 47 has considerable effect upon the operation of the meat tenderizer; and if these knives are not properly shaped, the meat will be separated from them with difficulty, and may be torn. The knife 46 is shown in Figure 7, where it is seen to consist of a flat portion of sheet metal, preferably stainless steel, having a series of radially extending blades 60 joined at their roots or innermost ends by an annular portion 61. The center of the blade 46 is provided with a hole 62 through which the tubing 42 fits, and the tips of the blades are preferably ground or otherwise sharpened as shown in Figures 2 and 6.

As seen in Figure 7, the blades 60 are tapered so that they are narrower at their tips than at their roots, for it has been found that in this way the blades may be withdrawn from the meat with a minimum of tearing. The meat is moved through the tenderizer by the rotation of the knives 46 and 47, but their rotation causes the blades to be inserted and withdrawn from the meat at an angle so that a blade which is wider at its tip will tend to tear the meat instead of moving out through the cut which has already been made.

The knife 47, shown in Figure 8, is very similar to the knife 46 and may, in fact, be formed from the latter. However, instead of having blades 60 which are parallel to the body of the knife 46, the blades are twisted so that blades 63 are formed which are perpendicular to the body of the knife 47, and parallel to the axis of the tube 42 which passes through the hole 62. By forming the knives 47 from the knives 46, die costs are reduced to a minimum, manufacturing operations are simplified, and the resulting article may be produced and sold for a lower price.

Operation

If it is assumed that a relatively thin steak, such as a minute steak, is to be tenderized by this device, the thumb screw 23 is adjusted until the roller 26 has been moved downwardly so that it just clears the knives 46 and 47, being prevented from further downward movement by the arms 21 of the crosshead 20 which bear against the pan 51. The steak is then placed in the tray 54 and fed into the knives 46 and 47 while the handle 33 is rotated. As the handle 33 is turned, the knives 46 and 47 engage the meat and force the latter against the roller 26 so that the knives are forced into the meat, cutting and breaking the fibers so that the meat is thereby rendered more tender. After the meat has passed between the roller 26 and the knife assembly 31, it moves on, to the right in Figures 1 and 5, and is held against continued rotation with the knife assembly 31 by the action of the pan 51. The knives 46 and 47 extend through slots 52 and 53; and as the handle 33 is rotated, the individual blades 60 and 63 are withdrawn through these slots, while the meat which is too large to pass through them, is stripped from the knives by the action of the pan 51. The pressure of the knives 46 and 47 against the meat forces the latter into the spiral grooves 30 to turn the roller 26 as the meat is advanced through the tenderizer, thereby providing the necessary pressure with a minimum of frictional resistance.

If a relatively thick steak is to be tenderized, the thumb screw 23 is adjusted so that the roller 26 is moved upwardly a sufficient distance to accommodate the steak between the latter and the pan 51. By then passing the meat through the tenderizer, one side thereof is cut with the pattern shown in Figure 4, the meat is then turned over, and passed through the tenderizer again so that the other side is similarly cut. By locating the pan 51 so that the blades 60 and 63 extend through it approximately one-half inch, steaks approximately one inch thick may be completely tenderized by their double passage through this device. Even thicker steaks may be accommodated in this machine, but only the outer half-inch on each side will be tenderized. However, it is quite rare that a steak thicker than one inch will be used if it is not made sufficiently tender by this treatment.

After the meat has been tenderized and it is desired to clean the device, the thumb screw 36 is removed and the handle 33 rotated until the pin 50 is alined with the slots 41. By then grasping the handle 33 and pulling so that the shaft 32 is withdrawn from the frame 10, the knife assembly 31 is permitted to drop downwardly so that the blades 60 and 63 are beneath the lower surface of the pan 51, and the entire knife assembly may be washed. By reversing this procedure, the tenderizer may be reassembled for later use. The roller 26 may be cleaned by wiping it with a damp cloth; but when a more thorough cleaning is desired, the thumb screws 17 may be loosened and the yoke 16 and crosshead 20 removed from the frame 10. This entire assembly may then be immersed in water and thoroughly cleaned, though this complete cleaning is necessary at only infrequent intervals if the roller 26 is regularly cleaned as previously suggested.

From this description it will be seen that a very efficient meat tenderizer has been provided, which, because of its improved construction, may be readily cleaned so that sanitation problems are reduced to a minimum. In addition, its construction permits improved methods of manufacture to be used which will result in a very efficient device which may be sold at a relatively low cost. It is not intended, of course, that this tenderizer operate with as little work or be capable of tenderizing as much meat as the larger power-driven models; for the latter have a field of usefulness which is separate from the field covered by this device.

While a preferred form of the device has been shown, it is apparent that modifications may be made which do not depart from the spirit of the invention, and the patent is not to be limited to the particular form or arrangement of parts herein described and shown, except as covered by the claims.

I claim:

1. A meat tenderizer which includes: a frame; a shaft rotatably and removably mounted in said frame; a pin extending through said shaft; a tube carried by said shaft and having a slot therein adapted to receive said pin whereby the rotation of said shaft is transmitted to said tube; a series of knives mounted on said tube, said knives being formed of relatively thin material, and having a series of radially extending blades around their peripheries, said blades being narrower at their tips than at their roots and having cutting edges parallel to the planes of the knives and substantially perpendicular to the axis of said shaft; a second series of knives mounted on said tube, said second series of knives being formed of relatively thin material and having a series of radially extending blades around their peripheries, said blades being twisted so that their cutting edges are substantially perpendicular to the planes of the knives and substantially parallel to the axis of said shaft; spacers mounted on said tube between adjacent knives, said knives being mounted so that adjacent knives have blades which are perpendicular to each other; a cap mounted on one end of said tube; a cap mounted on the other end of said tube, said caps clamping said knives and spacers together to cause them and said tube to rotate and operate as a unitary knife assembly, a roller having its axis parallel to the axis of rotation of said knife assembly; means mounting said roller in said frame, said means being adjustable to move said roller toward or away from said knife assembly; a pan attached to said frame having slots therein through which the blades of said knife assembly extend; and a manually rotatable handle attached to said shaft for rotating the latter.

2. A meat tenderizer which includes: a frame;

a shaft rotatably and removably mounted in said frame; a pin extending through said shaft; a tube carried by said shaft and having a slot therein adapted to receive said pin whereby the rotation of said shaft is transmitted to said tube; a series of knives mounted on said tube, said knives being formed of relatively thin material, and having a series of radially extending blades around their peripheries, said blades being narrower at their tips than at their roots and having cutting edges parallel to the planes of the knives and substantially perpendicular to the axis of said shaft; a second series of knives mounted on said tube, said second series of knives being formed of relatively thin material and having a series of radially extending blades around their peripheries, said blades being twisted so that their cutting edges are substantially perpendicular to the planes of the knives and substantially parallel to the axis of said shaft; spacers mounted on said tube between adjacent knives, said knives being mounted so that adjacent knives have blades which are perpendicular to each other; a cap mounted on one end of said tube; a cap mounted on the other end of said tube, said caps clamping said knives and spacers together to cause them and said tube to rotate and operate as a unitary knife assembly; a crosshead slidably mounted on said frame above said knife assembly; screw means adjustable to position said cross head; a backing roller mounted in said cross head for free rotation, and having its axis parallel to the axis of said knife assembly; a substantially horizontal pan adapted to receive and support a piece of meat, said pan being mounted on said frame immediately above the spacers of said knife assembly, and having a series of slots therein through which the blades of said assembly may extend, but through which said meat may not pass; and a manually rotatable handle attached to said shaft to rotate the latter and said knife assembly, said roller being rotated solely by the passage of said meat through said tenderizer.

FRANK H. MORGAN.

REFERENCES CITED

The following references are of record in the file of this patent:

UNITED STATES PATENTS

| Number | Name | Date |
|---|---|---|
| 116,166 | Dennison | June 20, 1871 |
| 716,062 | Tarleton | Nov. 18, 1902 |
| 1,391,119 | Johnson | Sept. 20, 1921 |
| 1,751,628 | Guggenheim et al. | Mar. 25, 1930 |
| 1,976,751 | Short | Oct. 16, 1934 |